US008787006B2

(12) United States Patent
Golko et al.

(10) Patent No.: US 8,787,006 B2
(45) Date of Patent: Jul. 22, 2014

(54) WRIST-WORN ELECTRONIC DEVICE AND METHODS THEREFOR

(75) Inventors: Albert J. Golko, Saratoga, CA (US); Mathias W. Schmidt, San Francisco, CA (US); Felix Alvarez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 13/187,310

(22) Filed: Jul. 20, 2011

(65) Prior Publication Data

US 2012/0194976 A1 Aug. 2, 2012

Related U.S. Application Data

(60) Provisional application No. 61/438,105, filed on Jan. 31, 2011.

(51) Int. Cl.
*H05K 7/00* (2006.01)
*G06F 1/16* (2006.01)
*H04M 1/04* (2006.01)

(52) U.S. Cl.
CPC ........ *G06F 1/163* (2013.01); *H04M 1/04* (2013.01)
USPC ................... 361/679.03; 455/575.6

(58) Field of Classification Search
CPC ................................. H04M 1/04; G06F 1/163
USPC ........ 455/41.2, 41.3, 90.3, 128, 556.1, 575.1, 455/575.6; 368/281, 282, 13; 345/173; 361/679.01, 679.03
See application file for complete search history.

(56) References Cited

U.S. PATENT DOCUMENTS

| | | | | |
|---|---|---|---|---|
| 5,008,864 A | * | 4/1991 | Yoshitake | 368/10 |
| 5,889,737 A | * | 3/1999 | Alameh et al. | 368/204 |
| 6,212,414 B1 | * | 4/2001 | Alameh et al. | 455/575.6 |
| 6,329,903 B1 | * | 12/2001 | Yamamori | 340/7.63 |
| 6,619,835 B2 | * | 9/2003 | Kita | 368/281 |
| 6,816,440 B2 | * | 11/2004 | Born et al. | 368/69 |
| 7,280,100 B2 | * | 10/2007 | Hanson et al. | 345/169 |
| 7,529,155 B2 | * | 5/2009 | Fasciano | 368/10 |
| 7,634,605 B2 | | 12/2009 | Laefer et al. | |

(Continued)

FOREIGN PATENT DOCUMENTS

| | | |
|---|---|---|
| JP | 2009164780 A2 | 7/2009 |
| JP | 2009164783 A2 | 7/2009 |
| JP | 2010268330 A2 | 11/2010 |

OTHER PUBLICATIONS

"A New Way to Nano", Apple Inc., www.apple.com/ipodnano, downloaded Jan. 4, 2011, 2 pages.

*Primary Examiner* — Angel R Estrada
*Assistant Examiner* — Dimary Lopez Cruz
(74) *Attorney, Agent, or Firm* — Kilpatrick Townsend & Stockton LLP

(57) ABSTRACT

Embodiments of electronic wristwatches are disclosed. According to one embodiment, an electronic wristband can provide additional electrical circuitry or devices that can be made available for use as or with an electronic device. In one embodiment, the electronic device can be a mobile electronic device that can be removably coupled to the electronic wristband which provides the additional circuitry or devices. Advantageously, the electronic device can utilize the additional electrical circuitry or devices provided within the electronic wristband to augment the capabilities of the electronic device. In another embodiment, the electronic device can be integrally formed with the electronic wristband which provides the additional circuitry or devices.

25 Claims, 7 Drawing Sheets

(56) References Cited

U.S. PATENT DOCUMENTS

| | | | |
|---|---|---|---|
| 7,764,488 B2 * | 7/2010 | Calvarese | 361/679.03 |
| 7,823,214 B2 | 10/2010 | Rubinstein et al. | |
| 8,098,141 B2 * | 1/2012 | Vanska et al. | 340/407.1 |
| 2002/0115478 A1 | 8/2002 | Fujisawa et al. | |
| 2007/0219655 A1 | 9/2007 | Erickson et al. | |
| 2011/0003665 A1 * | 1/2011 | Burton et al. | 482/9 |
| 2012/0122519 A1 * | 5/2012 | Jochheim | 455/556.1 |

* cited by examiner

WRIST-WORN ELECTRONIC DEVICE AND METHODS THEREFOR

CROSS-REFERENCE TO RELATED APPLICATION

This application claims priority to U.S. Provisional Patent Application No. 61/438,105, filed Jan. 31, 2011, entitled "WRIST-WORN ELECTRONIC DEVICE AND METHODS THEREFOR," which is herein incorporated by reference.

BACKGROUND OF THE INVENTION

Portable electronic devices are commonplace today. Some examples of portable electronic devices include portable digital assistants, portable media players, mobile telephones, and portable game players. In some cases these portable electronic devices can be carried by a user with relative ease, placed in a pocket of user's clothing, or clipped onto the user or the user's clothing. Some portable electronic devices are small enough to be worn by a user. One example of a portable electronic device is a highly portable media players, such as an iPod Nano™. Another example of a portable electronic device is an electronic watch.

Additionally, accessories have been utilized to provide additional functionality to portable electronic devices. Typically, accessories are small electrical products that can attach to a portable electronic device, such as through an external electrical connection port or through a short-range wireless connection. One example of an accessory is a wireless headset that can wirelessly connect to the portable electronic device to provide hands-free usage. Another example of an accessory is a FM receiver provided as a small electrical product that can be attached to a portable electronic device via a cable, which is useful when the portable electronic device does not already include a FM receiver. Still another example of an accessory is a wireless data capture device.

There are, however, continuing needs to make portable electronic devices smaller and more portable. There is also a continuing need to enhance functionalities of portable electronic devices.

SUMMARY

The invention pertains to an electronic wristwatch. According to one embodiment, an electronic wristband can provide additional electrical circuitry or devices that can be made available for use as or with an electronic device. In one embodiment, the electronic device can be a mobile electronic device that can be removably coupled to the electronic wristband which provides the additional circuitry or devices. Advantageously, the electronic device can utilize the additional electrical circuitry or devices provided within the electronic wristband to augment the capabilities of the electronic device. In another embodiment, the electronic device can be integrally formed with the electronic wristband which provides the additional circuitry or devices.

The invention may be implemented in numerous ways, including, but not limited to, a system, device, apparatus or method. Exemplary embodiments of the invention are discussed below.

As an electronic wristband to be worn on a wrist of a user, one embodiment of the invention can, for example, include at least a central portion and at least one band portion. The central portion can have a receptacle area configured to receive a mobile electronic device. The mobile electronic device can include a display and be independently useable apart from the electronic watchband. The least one band portion can be coupled to central portion and suitable to assist with securing the electronic wristband to the wrist of the user. The at least one band portion can also include at least one electrical component provided internal to the at least one band portion and operatively connected to the mobile electronic device when provided in the receptacle area.

As an electronic wristband to be worn on a wrist of a user, another embodiment of the invention can, for example, include at least a central portion and at least one band portion. The central portion can include a touch screen display, control circuitry and a battery. The touch screen display can be configured to present visual information to the user and to receive user input from the user. The control circuitry can be configured to control operation of the electronic watchband, and the battery can be configured to provide power to the electronic wristband. The at least one band portion can be coupled to the central portion and suitable to assist with securing the electronic wristband to the wrist of the user. The at least one band portion can include at least one electrical component provided internal to the at least one band portion and operatively connected to the control circuitry.

Various aspects and advantages of the invention will become apparent from the following detailed description taken in conjunction with the accompanying drawings.

BRIEF DESCRIPTION OF THE DRAWINGS

The invention will be readily understood by the following detailed description in conjunction with the accompanying drawings, in which.

DETAILED DESCRIPTION OF EMBODIMENTS OF THE INVENTION

The invention pertains to an electronic wristwatch. According to one embodiment, an electronic wristband can provide additional electrical circuitry or devices that can be made available for use as or with an electronic device. In one embodiment, the electronic device can be a mobile electronic device that can be removably coupled to the electronic wristband which provides the additional circuitry or devices. Advantageously, the electronic device can utilize the additional electrical circuitry or devices provided within the electronic wristband to augment the capabilities of the electronic device. In another embodiment, the electronic device can be integrally formed with the electronic wristband which provides the additional circuitry or devices.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
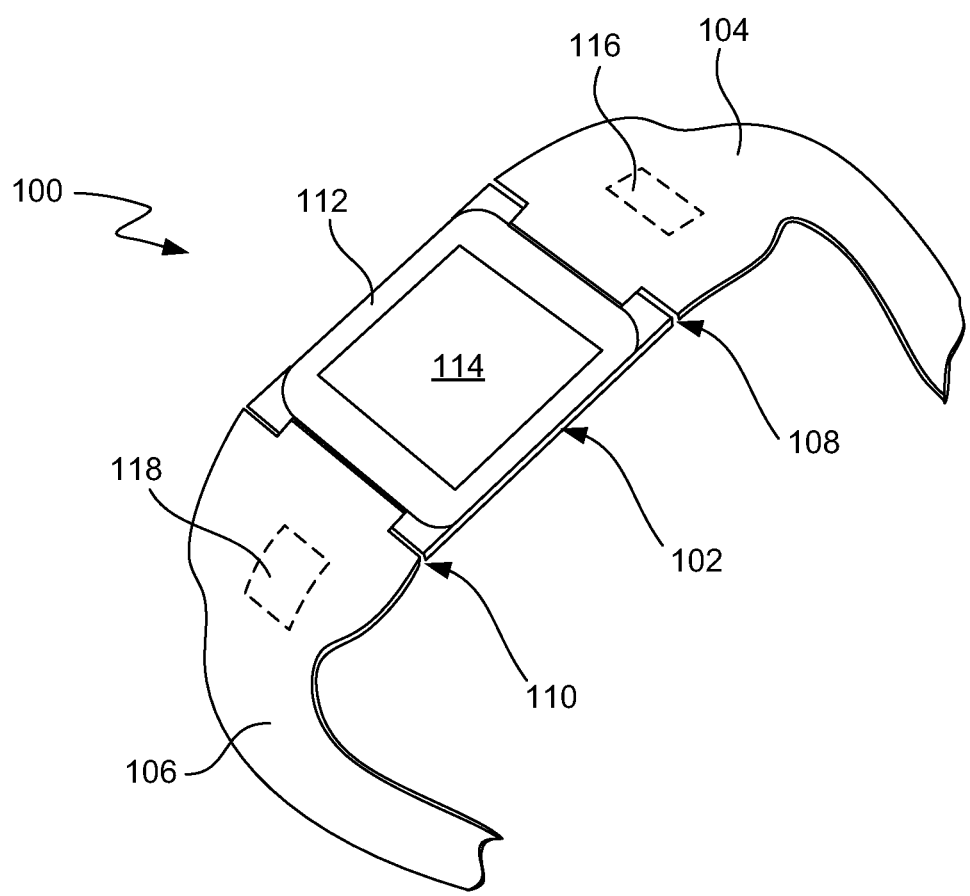
FIG. 1 is a perspective view of an electronic wristband according to one embodiment.

FIG. 1 is a perspective view of an electronic wristband 100 according to one embodiment. The electronic wristband 100 is suitable to be worn about a wrist of a user. The electronic wristband 100 can include a center portion 102, a first band portion 104 and a second band portion 106. The first band portion 104 is connected to the center portion 102 at a first hinge 108, and the second band portion 106 is connected to the center portion 102 at a second hinge 110. The opposite ends of the first and second band portions 104, 106 can include a clasp or other attachment mechanism to secure together such ends. As such, the first and second band portions 104, 106 can be secured about a wrist of the user. In one embodiment, the center portion 102 can be configured to receive a mobile electronic device 112 that can be coupled to the center portion 102 of the electronic wristband 100. In another embodiment, the center portion 102 can be configured to provide an integrated electronic device 112. The electronic device 112 can include a display 114. In one implementation, the display 114 is a touch screen display capable of receiving touch inputs from a user. The electronic device typically has one or more native functions. In one embodiment, the electronic device 112 has a native function as a portable media player and thus provides media storage and playback.

Additionally, one or both of the first band portion 104 and the second band portion 106 can include an electrical component. The electrical component can be internal to (e.g., embedded) within the associated band portion. For example, as shown in FIG. 1, the first band portion 104 can include a first band electrical component 116, and the second band portion 106 can include a second band electrical component 118. The electrical components 116, 118 can be electrically coupled to the electronic device 114 via wired or wireless means. As example, the electrical components 116, 118 can includes at least one of an accelerometer, an antenna, a GPS receiver, a wireless communication transceiver, or a haptic device.

Still further, the central portion 102 of the electronic wristband 100 can include one or more electrical components. The one or more electrical components in the central portion 102 can also be coupled to the electronic device 112 via wired or wireless means. As examples, the one or more electrical components included in the central portion 102 can be one or more of a haptic device, a printed circuit substrate, an accelerometer, or a battery.

The center portion 102, the first band portion 104 and the second band portion 106 can be formed of various different materials. For example, the material can include any one or more of rubber, silicone, plastic, mylar, vinyl, etc.

Figure 2:
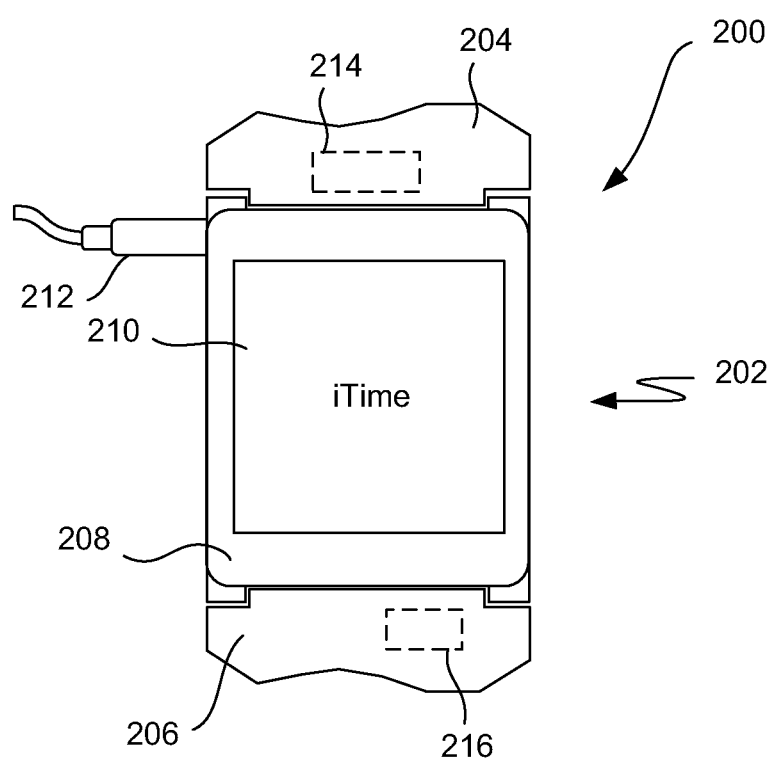
FIG. 2 is a front view of an electronic wristband according to one embodiment.

FIG. 2 is a front view of an electronic wristband 200 according to one embodiment. The electronic wristband 200 includes a center portion 202, a first band portion 204 and a second band portion 206. In one embodiment, the center portion 202 can be configured to receive a mobile electronic device 208. In such an embodiment, the mobile electronic device 208 can be removably secured to the center portion 202 by one or more of: detents, connectors, recesses, magnets, hook and loop materials, latches, etc. In another embodiment, the mobile electronic device 208 can be integral with the center portion 202. In either case, the mobile electronic device 208 can include a display 210 for output of information to a user. In one implementation, the display 210 can be a touch-sensitive display that can not only output information to a user but can also receive inputs from the user. The electronic wristband 200 can also include an audio receptacle for receiving an audio jack 212. The audio jack 212 can be associated with a speaker and/or microphone, such as an earphone or headset, for audio output or pickup.

Additionally, one or both of the first band portion 204 and the second band portion 206 can include an electrical component. The electrical component can be internal to (e.g., embedded within) the associated band portion. For example, as shown in FIG. 2, the first band portion 204 can include a first band electrical component 214, and the second band portion 206 can include a second band electrical component 216. As example, the electrical components 214, 216 can include at least one of an accelerometer, an antenna, a GPS receiver, a wireless communication transceiver, or a haptic device. The electrical components 214, 216 can be electrically coupled to the mobile electronic device 208 via wired or wireless means, regardless of whether the mobile electronic device 208 is integrated into the electronic wristband 200 or whether the mobile electronic device 208 is removably secured to the center portion 202 of the electronic wristband 200.

Still further, the central portion 202 of the electronic wristband 200 can include one or more electrical components (not shown). The one or more electrical components in the central portion 202 can also be coupled to the electronic device 208 via wired or wireless means. As examples, the one or more electrical components included in the central portion 202 can be one or more of a haptic device, a printed circuit substrate, an accelerometer, or a battery.

Figure 3A:
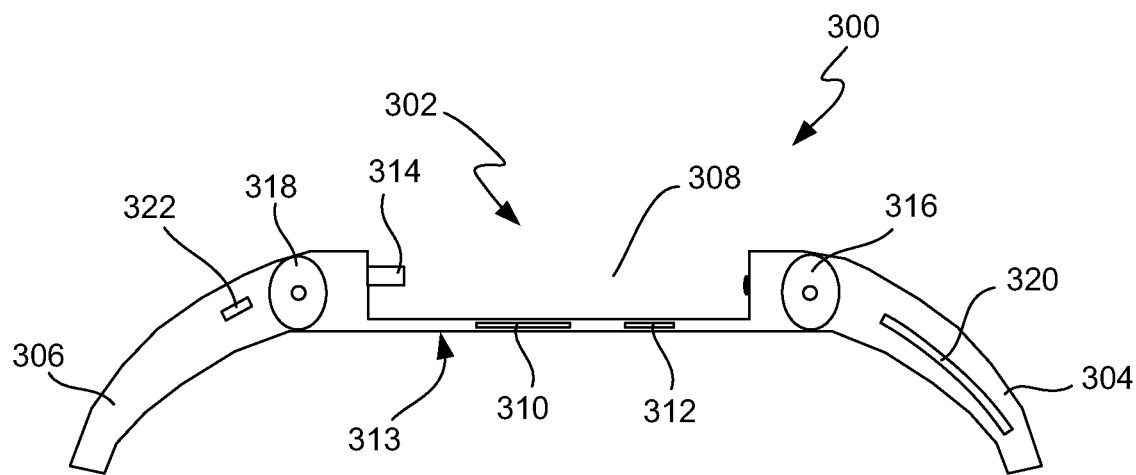
FIG. 3A is a cross-sectional side view of an electronic wristband according to one embodiment.

FIG. 3A is a cross-sectional side view of an electronic wristband 300 according to one embodiment. As illustrated in FIG. 3A, the electronic wristband 300 does not have a mobile electronic device attached. The electronic wristband 300 includes a central portion 302, a first band portion 304, and a second band portion 306. The central band portion 302 includes a receptacle area 308. Although the receptacle area 308 is configured to receive mobile electronic device, as depicted in FIG. 3A, the electronic wristband 300 does not have a mobile electronic device placed in the receptacle area 308. The central portion 302 can also include one or more electrical components. For example, as shown in FIG. 3A, the central portion 302 can include a printed circuit substrate 310 and a haptic device 312. In this embodiment, the printed circuit substrate 310 and the haptic device 312 are provided in a bottom surface 313 of the central portion 302. Alternatively or additionally, the central portion 302 can include an accelerometer and/or a battery as other or alternative electronic components.

The receptacle area 308 can also configured to retain a mobile electronic device that has been placed within the receptacle area 308. In one embodiment, a connector 314 can be used to at least partially retain a mobile electronic device in the receptacle area 308. The connector 314 can be shaped as a functional electrical connector to fit within a functional connector jack of the mobile electronic device. The connector 314 can be an electrical connection, such as a 30-pin connector, can provide not only provide mechanical retention but also electrical connection with electrical components provided by the electronic wristband 300.

The first band portion 304 can couple to the central portion 302 via a hinge 316. Similarly, the second band portion 306 can couple to the central portion 302 via a hinge 318. However, in an alternative embodiment, the first and second band portions 304 and 306 can couple to the central portion 302 without use of any hinges. In any case, the first band portion 304 can include one or more electrical components 320, and the second band portion 306 can include one or more electrical components 322. The one or more electrical components 320 provided within the first band portion 304 can be electrically coupled to other electrical components provided elsewhere, such as within (i) the central portion 302, (ii) a mobile electronic device coupled to the receptacle area 308, and/or (iii) the second band portion 306. Similarly, the one or more electrical components 322 provided within the second band portion 306 can be electrically coupled to other electrical components provided elsewhere, such as within (i) the central portion 302, (ii) a mobile electronic device coupled to the receptacle area 308, and/or (iii) within the first band portion 304.

The one or more electrical components 320 in the first band portion 304 can include an antenna. Since the first band portion 304 is typically formed from a non-metallic material, the antenna can be provided in the first band portion 304 with good operational performance. The antenna can be a short-range wireless antenna (e.g., Bluetooth™ antenna), a near-field antenna, or a Global Positioning System (GPS) antenna. The first band portion 304 can also include a plurality of one or more antennas.

The one or more electrical components 322 in the second band portion 306 can include an accelerometer. Since the second band portion 306 is typically formed from a non-metallic material, the one or more electrical components 322 can also include an antenna. In some embodiments, the electronic wristband 300 will include multiple antenna, in which case either or both of the first band portion 304 and the second band portion 306 can include one or more antennas. As examples, the one or more antennas can be selected from the group of: a short-range wireless antenna (e.g., Bluetooth™ antenna), a near-field antenna, or a Global Positioning System (GPS) antenna.

More generally, the one or more electronic components 320 in the first band portion 304 and the one or more electronic components 322 in the second band portion 306 can vary depending on design parameters applied to the electronic wristband 300. As examples, the one or more electronic components 320, 322 can be select from the group including: an accelerometer, an antenna, a GPS receiver, a wireless communication transceiver, or a haptic device.

Figure 3B:
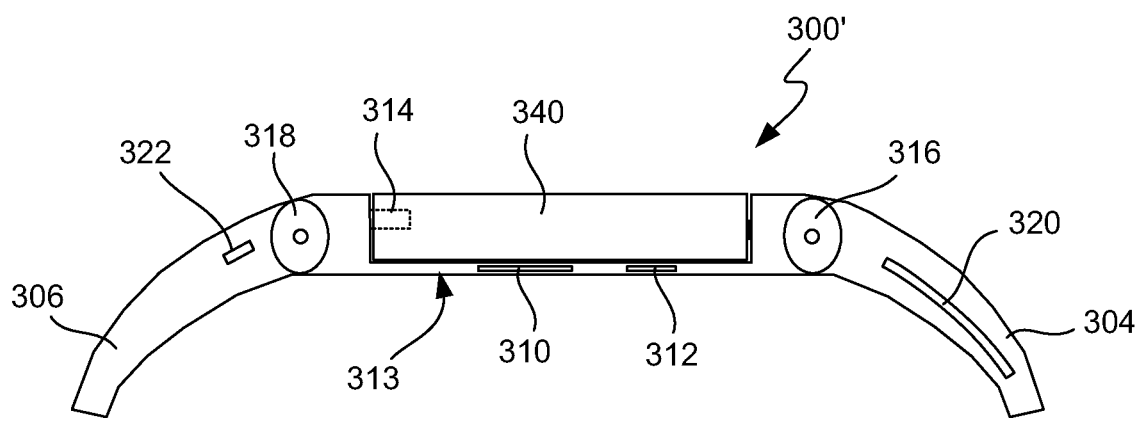
FIG. 3B is a cross-sectional side view of an electronic wristband according to one embodiment.

FIG. 3B is a cross-sectional side view of an electronic wristband 300' according to one embodiment. The electronic wristband 300' is the same as the electronic wristband 300 shown in FIG. 3A. Namely, the electronic wristband 300' has a mobile electronic device 340 attached. The mobile electronic device 340 is removably secured in the receptacle area 308. For example, at least the connector 314 is used to assist with securing the mobile electronic device 340 in the receptacle area 308. Once the mobile electronic device 340 is secured in the receptacle area 308, the electrical connector 314 (when a functional electrical connector) can be used to enable electrical connection between the mobile electronic device 340 and any of the one or more electrical components 310, 312, 322 or 322 within the electronic wristband 300'.

Figure 4:
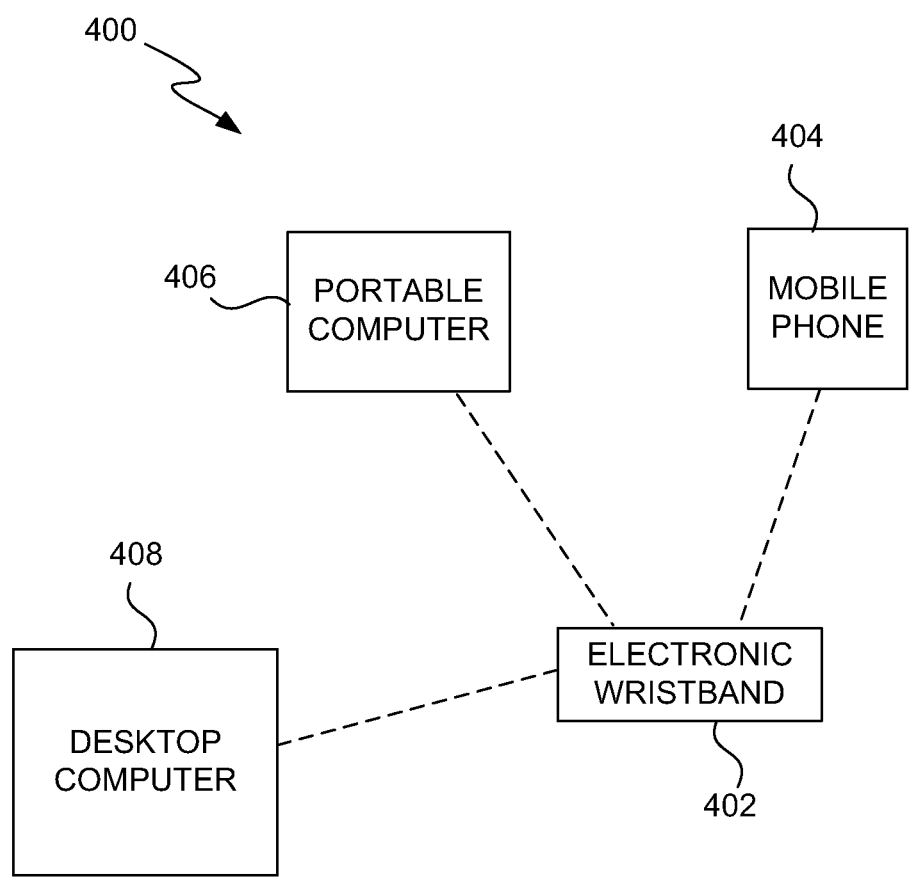
FIG. 4 is a block diagram of a personal wireless environment according to one embodiment.

FIG. 4 is a block diagram of a personal wireless environment 400 according to one embodiment. The personal wireless environment 400 allows a user of multiple electronic devices to make use of an electronic wristband 402 for certain output information and/or for certain input. The presence of the electronic wristwatch 402 in the personal wireless environment 400 allows for efficient and convenient user interaction with one or more other electronic devices. More particularly, as shown in FIG. 4, the personal wireless environment 400 can enable the user of the electronic wristband 402 to interact with a mobile phone 404, a portable computer 406 or a desktop computer 408. The interaction with the electronic wristband 402 can be wired or wireless. However, for ease of use, the electronic wristband 402 can support wireless interaction with nearby electronic devices, such as one or more of the mobile phone 404, the portable computer 406 or the desktop computer 408. Here, the electronic wrist band 402 can be considered to form or use a piconet established between the electronic wristband 402 and one or more of the mobile phone 404, the portable computer 406 or the desktop computer 408.

The personal wireless environment 400 can be configured to support one or more information exchanges using an electronic wristband as discussed herein.

One information exchange facilitated by the personal wireless environment 400 is a notification (or alert) that is initiated by one electronic device to a nearby electronic wristband (e.g., electronic wristband 402). In one implementation, the electronic wristband 402 can receive a notification request from another nearby electronic device, such as the mobile phone 404. Typically, a user would be carrying or wearing the electronic wristband 402 and the mobile phone 404. The notification request can be received (via wire or wirelessly) at the electronic wristband 402 and can cause the electronic wristband 402 to notify the user. In general, the notification request can be considered a push notification from another electronic device to the electronic wristband 402. As one example, the notification request can cause the electronic wristband 402 to activate haptic device, an audio device and/or a display device of the electronic wristband 402 to signal the user of the notification. Once the user is notified (or altered), the user can in some cases view additional information pertaining to the notification via the display device or hear additional information pertaining to the notification via the audio device (e.g., a speaker). In some cases, the user can also further interact with the electronic wristband 402 to respond to the notification. For example, if the notification alerts the user of an incoming phone call at the mobile phone 404, through interaction with the electronic wristband 402, the user can accept or decline the incoming call. Hence, advantageously, the user can use the electronic wristband 402 as a remote Input/Output (I/O) interface for the mobile phone 404.

Another information exchange facilitated by the personal wireless environment 400 is a notification (or alert) that is initiated by one electronic device to a nearby electronic wristband (e.g., electronic wristband 402).

An incoming phone call, a text message, a social network post, or a news feed directed to a user's electronic device (e.g., mobile phone) can cause a notification to be provided to a nearby electronic wristband of the user. In effect, incoming messages or data to a user's electronic device can be pushed (e.g., wirelessly transferred) to the electronic wristband.

Besides information exchange, an electronic wristband can be use to provide remote user controls to a user. For example, when a portable media player (e.g., MP3 player, or mobile device (e.g., smart phone) operating media player application) is playing a media item, the portable media player can be controlled by one or more user controls made available by the electronic wristwatch. For example, the electronic wristband can be configured to present media playback controls on a touch screen of the electronic wristband.

Applications operating on a user's electronic device can also initiate an alert to a nearby electronic wristband. For example, the alert could pertain to calendar alerts, stock alerts, weather alerts, etc. Also, applications can also seek remote user input from the electronic wristband.

Still further, an electronic wristband can also alert is user if its linked electronic device goes out of range. For example, if the electronic device is a mobile phone or a mobile computing device, an out of range notification to the user via the electronic wristband can thus notify the user that their electronic device is out of range. This notification can serve as a warning that they may have forgotten their electronic device, that the electronic device may have be improperly taken, or that simply they are now out of range.

Figure 5:
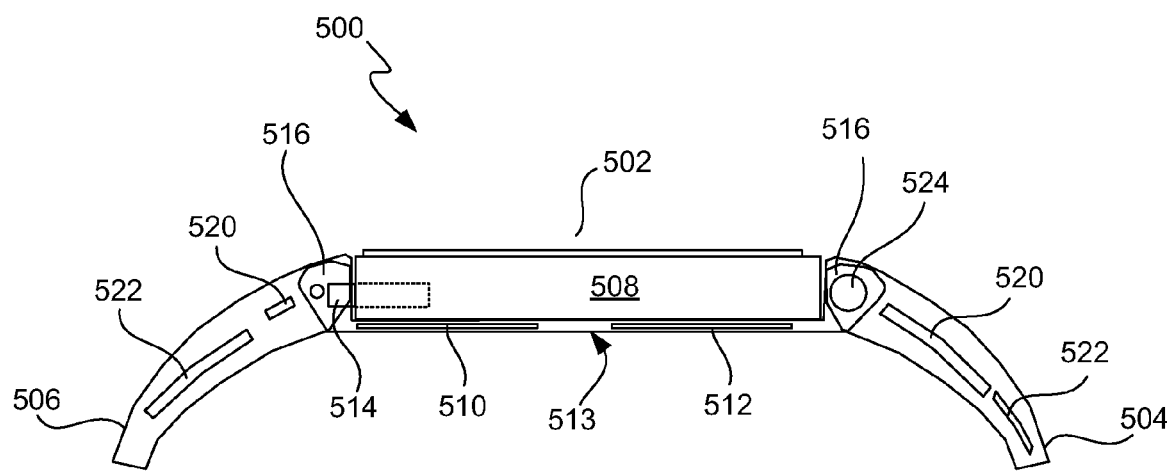
FIG. 5 is a cross-sectional side view of an electronic wristband according to one embodiment.

FIG. 5 is a cross-sectional side view of an electronic wristband 500 according to one embodiment. The electronic wristband 500 includes a central portion 502, a first band portion 504, and a second band portion 506. The central band portion 502 includes a receptacle area that removably retains a mobile electronic device 508. The central portion 502 can also include one or more electrical components. For example, as shown in FIG. 5, the central portion 502 can include a printed circuit substrate 510 and a haptic device 512. In this embodiment, the printed circuit substrate 510 and the haptic device 512 are provided in a bottom surface 513 of the central portion 502. Alternatively or additionally, the central portion 502 can include an accelerometer, a battery and/or various other electronic components.

The receptacle area can be configured to retain the mobile electronic device 508 that has been placed within the receptacle area. In one embodiment, a connector 514 can be used to at least partially retain the mobile electronic device 508 in the receptacle area. The connector 514 can be an electrical connector that fits within a connector jack of the mobile electronic device. The connector 514 can be an electrical connector, such as a 30-pin connector, which can not only provide mechanical retention but also electrical connection with one or more of electrical components provided by the electronic wristband 500.

The first band portion 504 can couple to the central portion 502 via a hinge 516. Similarly, the second band portion 506 can couple to the central portion 502 via a hinge 518. However, in an alternative embodiment, the first and second band portions 504 and 506 can couple to the central portion 502 without use of any hinges. In any case, the first band portion 504 can include a Bluetooth antenna 520 and a near-field antenna 522. The Bluetooth antenna 520 and the near-field antenna 522 can be electrically coupled to the portable electronic device 508 via the connector 514. The first band portion 504 can also include an audio port 524 for receiving an audio jack plug. The audio port 524 can be electrically coupled to the portable electronic device 508 via the connector 514. The second band portion 506 can include an accelerometer 524 and a Global Positioning System (GPS) antenna 526. The accelerometer 524 and the GPS antenna 526 can be electrically coupled to the portable electronic device 508 via the connector 514.

Figure 6:
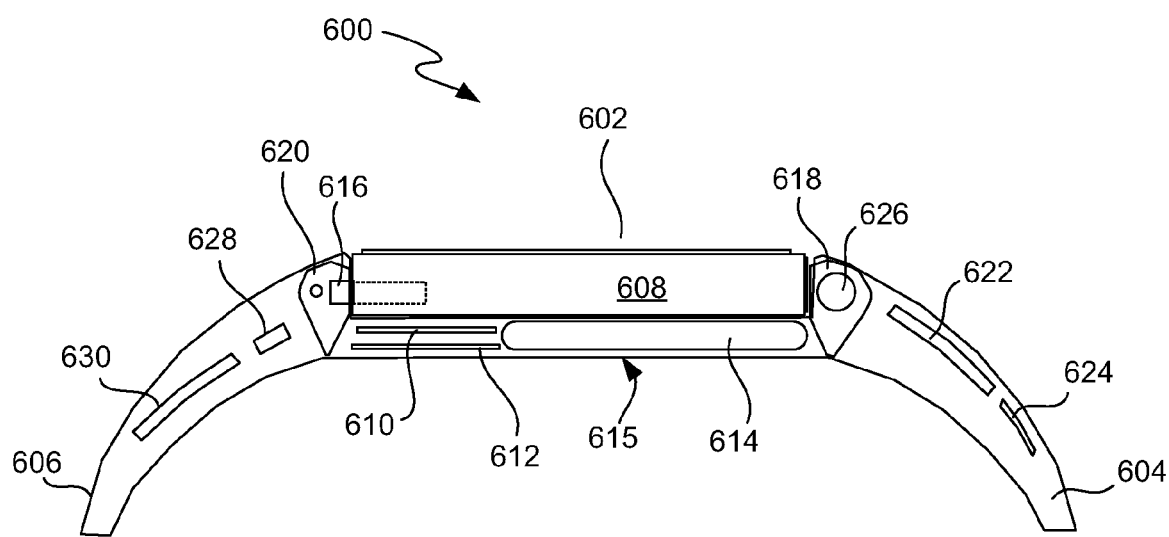
FIG. 6 is a cross-sectional side view of an electronic wristband according to one embodiment.

FIG. 6 is a cross-sectional side view of an electronic wristband 600 according to one embodiment. The electronic wristband 600 includes a central portion 602, a first band portion 604, and a second band portion 606. The central band portion 602 includes a receptacle area that removably retains a mobile electronic device 608. As one example, the mobile electronic device 608 can pertain to a highly portable media player, such as an iPod™ (e.g., iPod Nano™) available from Apple Inc. of Cupertino, Calif. The central portion 602 can also include one or more electrical components. For example, as shown in FIG. 6, the central portion 602 can include a printed circuit substrate 610, a haptic device 612 and a battery 614. The printed circuit substrate 610 can, for example, be a flex circuit, rigid flex, or a Printed Circuit Board (PCB). The haptic device 612 can be a vibrator, a piezo-electric device, or other device providing a user sensible condition. The battery 614 can be rechargeable and can be used to power the electronic wristband 600 and possibly also to charge of battery within the mobile electronic device 608. In this embodiment, the printed circuit substrate 610, the haptic device 612 and the battery 614 are provided in a bottom region 615 of the central portion 602. Alternatively or additionally, the central portion 602 can include any of a variety of other electronic components.

The receptacle area can be configured to retain the mobile electronic device 608 that has been placed within the receptacle area. In one embodiment, a connector 616 can be used to at least partially retain the mobile electronic device 608 in the receptacle area. The connector 616 can be an electrical connector that fits within a connector jack of the mobile electronic device. The connector 616 can be an electrical connector, such as a 30-pin connector, which can not only provide mechanical retention but also electrical connection with one or more of electrical components provided by the electronic wristband 600.

The first band portion 604 can couple to the central portion 602 via a hinge 618. Similarly, the second band portion 606 can couple to the central portion 602 via a hinge 620. However, in an alternative embodiment, the first and second band portions 604 and 606 can couple to the central portion 602 without use of any hinges. In any case, the first band portion 604 can include a Bluetooth antenna 624 and a near-field antenna 626. The Bluetooth antenna 624 and the near-field antenna 626 can be electrically coupled to the portable electronic device 608 via the connector 616. The first band portion 604 can also include an audio port 626 for receiving an audio jack plug. The audio port 626 can be electrically coupled to the portable electronic device 608 via the connector 616. The second band portion 606 can include an accelerometer 628 and a Global Positioning System (GPS) antenna 630. The accelerometer 628 and the GPS antenna 630 can be electrically coupled to the portable electronic device 608 via the connector 614.

In one embodiment, an electronic wristband can integrally include electrical components to provide all its supported functionality and thus does not receive, couple to or need electronic components of a portable electronic device. In this embodiment, unlike FIGS. 3A, 3B, 5, 6 and 7, the electronic wristband does not include a receptacle for receiving a portable electronic device.

Figure 7:
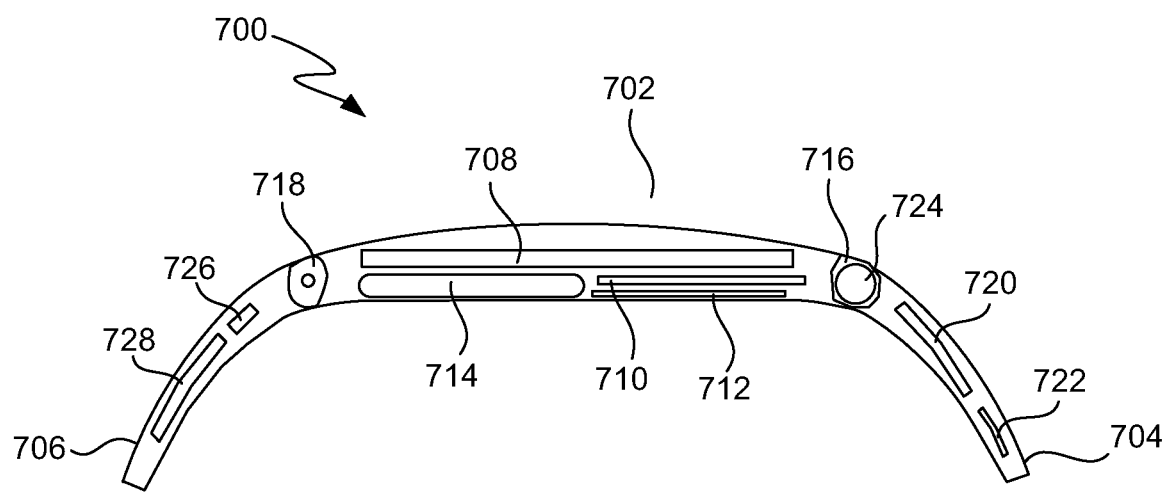
FIG. 7 is a cross-sectional side view of an electronic wristband according to one embodiment.

FIG. 7 is a cross-sectional side view of an electronic wristband 700 according to one embodiment. The electronic wristband 700 integrates all of the electrical components it requires and thus does not receive a separate portable electronic device. The electronic wristband 700 includes a central portion 702, a first band portion 704, and a second band portion 706. The central band portion 702 can include one or more electrical components. For example, as shown in FIG. 7, the central portion 702 can include a display screen 708, which may be a touch screen, a printed circuit substrate 710 having electronic circuitry, a haptic device 712 and a battery 714. In this embodiment, the printed circuit substrate 710, the haptic device 712 and the battery 714 are provided at least partially within the central portion 702. Alternatively or additionally, the central portion 702 can include any of a variety of other electronic components.

The first band portion 704 can couple to the central portion 702 via a hinge 716. Similarly, the second band portion 706 can couple to the central portion 702 via a hinge 718. However, in an alternative embodiment, the first and second band portions 704 and 706 can couple to the central portion 702 without use of any hinges. In any case, the first band portion 704 can include a Bluetooth antenna 720 and a near-field antenna 722. The Bluetooth antenna 720 and the near-field antenna 722 can be electrically coupled to the electronic components in the central portion 702 and/or the second band portion 706. The first band portion 704 can also include an audio port 724 for receiving an audio jack plug. The audio port 724 can be electrically coupled to the electronic components in the central portion 702 and/or the second band portion 706. The second band portion 706 can include an accelerometer 726 and a Global Positioning System (GPS) antenna 728. The accelerometer 726 and the GPS antenna 728 can be electrically coupled to electronic components in the central portion 702 and/or the second band portion 706.

In the various embodiment discussed herein, the electronic wristband can include a haptic device. As examples, the haptic device can be a vibrator device or a piezo-electric device. The haptic device can produce a vibration that is capable of being sensed by the user. Since the haptic device can be positioned in the electronic wristband, it is positioned proximate to the user's wrist. As a result, only minimal vibration is needed to be adequately sensed by a user. Advantageously, in some embodiments, the vibration can be non-audible to nearby persons and only detectable by the user. As another advantage, by providing the haptic device proximate to the user's wrist, it is unlikely that a user would miss a notification because of not sensing the vibration.

In the various embodiment discussed herein, the electronic wristband can, for example, extend Input/Output (I/O) of a portable electronic device by providing visual indicators, display, audio, tactile, haptics, buttons, switches, detectors, touch pads, navigation pads, joysticks, keys, etc. Additionally or alternatively, the electronic components can be associated with one or more sensors, such as accelerometers, location (e.g., GPS), proximity, biometric, force and/or the like that extend the capabilities of the electronic wristband or its associated portable electronic device. The electronic components as described herein can also include electronic subassemblies which are a multi-part electronic component. Examples of multi-part electronic components include an electronic circuit, integrated circuit, or substrate (e.g., PCB, flex circuit).

In the various embodiment discussed herein, the electronic wristband can, for example, be formed by molding techniques. Molding allows electronic components to be embedded in portions of the electronic wristband. Molding also allows a desired shape of the electronic wristband to be formed. Various molding techniques include compression molding, transfer molding, injection molding, and the like. Some techniques that may be useful to integrate electronics into the molded part include insert molding and/or double shot injection molding. In one embodiment, electrical components (as well as other structures) may be suspended within a mold, and the material may be allowed to be placed around it such that the electrical components are at least partially and possibly fully embedded within the portion of the electronic wristband.

Another aspect of embodiment of the invention pertains to use of gestures with one's arm or wrist to provide a user input to an electronic wristband. For example, once a notification request is received at an electronic wristband, the electronic wristband can notify its user. The electronic wristband can also seek a response to the notification. In one embodiment, the electronic wristband can monitor one or more sensors to detect a user gesture with the user's arm or wrist. For example, the sensors can include an accelerometer and/or gyroscope. Typically, the sensors are digital sensors. The gesture can correspond to specific movements of a user's wrist or arm can vary with implementation. For example, the gesture might be a horizontal movement for one user input option (e.g., decline incoming call), and might be a vertical movement for another user input option (e.g., accept incoming call). For example, the gesture might be a single shake (or bounce, tap, etc.) of the user's wrist for one user input option (e.g., accept incoming call), and might be a pair of shakes (or bounces, taps, etc.) for another user input option (e.g., decline incoming call).

The various aspects, embodiments, implementations or features of the invention can be used separately or in any combination.

The advantages of the invention are numerous. Different embodiments or implementations may, but need not, yield one or more of the following advantages. One advantage of certain embodiments of the invention is that an electronic wristband having one or more electronic components embedded therein can serve to extend or augment capabilities of a portable electronic device. Another advantage of certain embodiments of the invention is that an electronic wristband can be removably secured to the electronic wristband to electrically couple to the one or more electronic components embedded in the electronic wristband. Still another advantage of certain embodiments of the invention is that an electronic wristband can communicate with other nearby computing devices to provide information directly to a user via the electronic wristband.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic wristband to be worn on a wrist of a user, the electronic wristband comprising:
   a central portion having a receptacle area configured to receive and electrically connect to a mobile electronic device, the mobile electronic device including a display and being independently useable apart from the electronic wristband to perform a first set of functions; and
   at least one band portion coupled to the central portion and suitable to assist with securing the electronic wristband to the wrist of the user, the at least one band portion including a wireless communication transceiver provided internal to the at least one band portion and operatively connected to the mobile electronic device when the mobile electronic device is received in the receptacle area,
   wherein the mobile electronic device, when received in the receptacle area, is operable to perform a second set of functions, the second set of functions including all of the first set of functions and further including wirelessly communicating user input received by the mobile electronic device to a second electronic device via the wireless communication transceiver.

2. An electronic wristband as recited in claim 1, wherein the electronic wristband further comprises:
   an electrical connector provided at the receptacle area and used at least in part to removably secure the mobile electronic device to the receptacle area.

3. An electronic wristband as recited in claim 2, wherein the wireless communication transceiver provided internal to the at least one band portion is electrically connected to electronic circuitry within the mobile electronic device via the electrical connector.

4. An electronic wristband as recited in claim 1, wherein the at least one band portion further includes at least one of an accelerometer, an antenna, a GPS receiver, or a haptic device.

5. An electronic wristband as recited in claim 1, wherein the first set of functions of the mobile electronic device includes media storage and playback.

6. An electronic wristband as recited in claim 1, wherein the display of the mobile electronic device includes a touch screen.

7. An electronic wristband as recited in claim 1, wherein the central portion includes at least one electrical component.

8. An electronic wristband as recited in claim 7, wherein the at least one electrical component included in the central portion includes at least one of a haptic device, a printed circuit substrate, or an accelerometer.

9. An electronic wristband as recited in claim 7, wherein the at least one electrical component provided in the central portion includes at least a battery.

10. An electronic wristband as recited in claim 7, wherein the at least one electrical component provided in the central portion includes at least a haptic device.

11. An electronic wristband as recited in claim 10, wherein the haptic device is provided adjacent a bottom surface of the central portion that is placed against the wrist of the user when the electronic wristband is being worn on the wrist of the user.

12. An electronic wristband as recited in claim 11, wherein the haptic device is configured to controllably provide a physical alert to the user via the wrist of the user.

13. An electronic wristband as recited in claim 12, wherein the haptic device includes at least a piezoelectric device.

14. An electronic wristband as recited in claim 7, wherein the at least one electrical component includes a sensor and the second set of functions further includes determining the user input based at least in part on monitoring the sensor to detect an arm or wrist gesture.

15. An electronic wristband as recited in claim 14, wherein the sensor includes one or both of an accelerometer or a gyroscope.

16. An electronic wristband as recited in claim 1, wherein the electronic wristband includes a battery, wherein the battery is configured to supply electrical power to the wireless communication transceiver.

17. An electronic wristband as recited in claim 16, wherein the battery is further configured to supply electrical power to the mobile electronic device when the mobile electronic device is provided in the receptacle area.

18. An electronic wristband as recited in claim 1, wherein the at least one band portion includes at least a first band and a second band, each of the first band and the second band coupled to the central portion.

19. An electronic wristband as recited in claim 18, wherein the first band includes the wireless communication transceiver, and the second band includes at least one second band electrical component.

20. An electronic wristband as recited in claim 19, wherein the first band includes at least a first antenna, and wherein the at least one second band electrical component includes at least a second antenna.

21. An electronic wristband as recited in claim 1, wherein the second set of functions further includes receiving, via the wireless communication transceiver, a notification from the second electronic device and presenting the notification to the user.

22. An electronic wristband as recited in claim 21, wherein the notification is presented on the display of the mobile electronic device.

23. An electronic wristband as recited in claim 21, wherein the second electronic device is a mobile phone and the notification pertains to an incoming call at the mobile phone.

24. An electronic wristband as recited in claim 23, wherein the user input includes an indication to accept or decline the incoming call.

25. An electronic wristband as recited in claim 21, wherein the notification pertains to an alert generated by an application operating on the second electronic device.

* * * * *